US009337523B2

(12) United States Patent
Kim et al.

(10) Patent No.: US 9,337,523 B2
(45) Date of Patent: May 10, 2016

(54) DIGITAL CAMERA

(71) Applicant: Samsung Electronics Co., Ltd., Suwon-si, Gyeonggi-do (KR)

(72) Inventors: Hyun-jin Kim, Seoul (KR); Byung-chul Kim, Hwaseong-si (KR); Jong-ho Park, Suwon-si (KR); Hyung-soo Park, Incheon (KR); Young-ju Lee, Seoul (KR); Won-bin Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 14/276,389

(22) Filed: May 13, 2014

(65) Prior Publication Data
US 2014/0340576 A1 Nov. 20, 2014

(30) Foreign Application Priority Data

May 14, 2013 (KR) .......................... 10-2013-0054464

(51) Int. Cl.
*H04N 1/00* (2006.01)
*H01Q 1/00* (2006.01)
*H04N 5/225* (2006.01)
*H04N 5/232* (2006.01)
*H01Q 19/06* (2006.01)

(52) U.S. Cl.
CPC .............. *H01Q 1/00* (2013.01); *H04N 1/00315* (2013.01); *H04N 5/2252* (2013.01); *H04N 5/23203* (2013.01)

(58) Field of Classification Search
CPC .............. H04N 5/2254; H04N 5/2252; H04N 1/00315; H04N 5/23203; H01Q 1/241; H01Q 1/243; H01Q 1/36; H01Q 1/523; H01Q 19/062; H01Q 1/00; H01N 1/00095

USPC ........ 348/211.99, 211.1, 211.2, 211.3, 211.4, 348/335, 373–376, 355; 396/56; 455/665.1, 455/575.1; 343/702
See application file for complete search history.

(56) References Cited

U.S. PATENT DOCUMENTS

| 7,623,777 | B2 | 11/2009 | Yamaki | |
| 7,653,296 | B2 | 1/2010 | Wakamizu et al. | |
| 7,738,932 | B2 * | 6/2010 | Chen | H01Q 1/243 455/550.1 |
| 8,436,775 | B2 * | 5/2013 | Brey | H01Q 1/12 343/702 |
| 8,599,089 | B2 | 12/2013 | Bevelacqua et al. | |
| 2003/0142032 | A1 * | 7/2003 | Lichtfuss | 343/873 |
| 2005/0219144 | A1 * | 10/2005 | Ying | 343/895 |

(Continued)

FOREIGN PATENT DOCUMENTS

KR 20120130011 A 11/2012

*Primary Examiner* — Tuan Ho
*Assistant Examiner* — Marly Camargo
(74) *Attorney, Agent, or Firm* — Jefferson IP Law, LLP

(57) ABSTRACT

A digital camera is capable of performing wireless communication with an external device. The digital camera includes a camera body and a lens barrel assembly mounted to the camera body and comprising a plurality of barrels for accommodating a plurality of photographing lenses, wherein at least one of the plurality of barrels is used as an antenna barrel configured as an antenna for the wireless communication, wherein the antenna barrel is formed from a metal material and comprises at least one slit filled with a dielectric material, so that the antenna barrel emits radio waves to perform the antenna function, and wherein an outer casing of the camera body, which surrounds an outer surface of the antenna barrel, is formed from a metal material so as to operate as a ground of the antenna barrel.

21 Claims, 15 Drawing Sheets

(56) References Cited

U.S. PATENT DOCUMENTS

| | | | |
|---|---|---|---|
| 2006/0087564 A1* | 4/2006 | Kawamura | H04N 5/232 348/211.99 |
| 2007/0098384 A1* | 5/2007 | Wakamizu | G03B 17/04 396/56 |
| 2012/0293668 A1* | 11/2012 | Huang et al. | 348/207.1 |
| 2014/0240581 A1* | 8/2014 | Sung et al. | 348/335 |

* cited by examiner

DIGITAL CAMERA

CROSS-REFERENCE TO RELATED APPLICATIONS

This application claims the benefit under 35 U.S.C. §119 (a) of a Korean patent application filed on May 14, 2013 in the Korean Intellectual Property Office and assigned Serial number 10-2013-0054464, the entire disclosure of which is hereby incorporated by reference.

TECHNICAL FIELD

The present disclosure relates to a digital camera. More particularly, the present disclosure relates to a digital camera capable of performing wireless communication.

BACKGROUND

Widespread use of the Internet and smartphones demand evolution of digital cameras from simple storing medium to a medium for content sharing. According to such demand, new digital camera products are equipped with wireless communication abilities.

A digital camera for wireless communication essentially requires an antenna. The antenna radiates radio wave to outside the digital camera for the purpose of radio wave transmission and reception. The radio waves radiated from the antenna pass through non-metal material. However, the radio waves radiated from the antenna do not pass through metal materials.

The digital camera includes a variety of metal components therein, and to respond to customer's demands for more appealing product design, more digital cameras recently employ metal casings. The metals in the metal casings hinder radiation of radio waves from the antenna generally mounted inside the digital camera.

As a result of the presence of metals, a digital camera according to the related art thus has deteriorating radiation efficiency of an antenna mounted inside the camera, due to presence of metals. Considering sizes of the recent cameras which are made compacter to reflect market trends, ensuring that the digital camera has space for an antenna in the digital camera is increasingly difficult.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a digital camera which is compact sized, but provides optimum antenna performance.

In accordance with an aspect of the present disclosure, a digital camera capable of performing wireless communication with an external device is provided. The digital camera includes a camera body, and a lens barrel assembly mounted to the camera body and comprising a plurality of barrels for accommodating a plurality of photographing lenses, wherein at least one of the plurality of barrels is used as an antenna barrel configured as an antenna for the wireless communication, wherein the antenna barrel is formed from a metal material and comprises at least one slit filled with a dielectric material, so that the antenna barrel emits radio waves to perform the antenna function, and wherein an outer casing of the camera body, which surrounds an outer surface of the antenna barrel, is formed from a metal material so as to operate as a ground of the antenna barrel.

In accordance with another aspect of the present disclosure, the antenna barrel may be one of the plurality of barrels that is arranged at an outer-most side.

In accordance with another aspect of the present disclosure, the outer casing that surrounds the outer surface of the antenna barrel, may be arranged perpendicularly to the antenna barrel.

In accordance with another aspect of the present disclosure, the slit may be formed along a circumferential direction of the antenna barrel.

In accordance with another aspect of the present disclosure, the digital camera may include a feeding unit mounted to an inner circumference of the antenna barrel configured to feed voltage to the antenna barrel.

In accordance with another aspect of the present disclosure, the feeding unit may be extended along the slit to partially cover the slit.

In accordance with another aspect of the present disclosure, the feeding unit may include a first feeding member which is conductive, and which is in contact with a first point of the antenna barrel to feed a first voltage to the first point, and a second feeding member which is conductive, and which is in contact with a second point of the antenna barrel to feed a second voltage to the second point. The second feeding member may include a barrel contact which is in contact with the second point, and an extension portion extended from the barrel contact toward the first feeding member.

In accordance with another aspect of the present disclosure, the slit may be formed to surround an outer circumference of the antenna barrel. Mounted to an inner wall of the antenna barrel may be a first conductive member and a second conductive members which are at predetermined interval and which are overlapped with the slit, respectively, and one of the first and second conductive members may be in contact with the feeding unit.

In accordance with another aspect of the present disclosure, the slit of the antenna barrel may be provided in plural number, in which case the slits are at predetermined intervals from each other.

In accordance with another aspect of the present disclosure, the antenna barrel may be used as a Multiple-Input and Multiple-Output (MIMO) antenna or an array antenna.

In accordance with another aspect of the present disclosure, the antenna barrel may be movably mounted to the camera body so as to rotate along a circumferential direction of the antenna barrel.

In accordance with an aspect of the present disclosure, a digital camera capable of performing wireless communication with an external device is provided. The digital camera includes a camera body, a lens barrel assembly mounted to the camera body and comprising a plurality of barrels for accommodating a plurality of photographing lenses, and at least one antenna for the wireless communication which is mounted to one of the plurality of barrels. The one of the plurality of barrels to which the antenna is mounted, may be formed from a non-metal material, and wherein an outer casing of the camera body, which surrounds an outer surface of the one of the plurality of barrels to which the antenna is mounted, may be formed from a metal material so as to operate as a ground of the antenna.

In accordance with another aspect of the present disclosure, the one of the plurality of barrels to which the antenna is mounted, may be a barrel among the plurality of barrels that is arranged at an outer-most side of the plurality of barrels.

In accordance with another aspect of the present disclosure, the outer casing that surrounds the outer surface of the one of the plurality of barrels to which the antenna is mounted, may be arranged perpendicularly to the barrel to which the antenna is mounted.

In accordance with another aspect of the present disclosure, the antenna may be a slit antenna which has a slit formed therein, and wherein the slit may be formed along a circumferential direction of the barrel to which the antenna is mounted.

In accordance with another aspect of the present disclosure, the antenna may include a feeder configured to feed voltage for the purpose of emitting radio waves.

In accordance with another aspect of the present disclosure, the feeder may include a first feeder configured to feed a first voltage to a first point of the antenna, and a second feeder configured to feed a second voltage to a second point of the antenna. The second feeder may include a protrusion portion protruding from the second point in a widthwise direction of the slit, and an extension portion extended from the protrusion portion within the slit toward the first feeder.

In accordance with another aspect of the present disclosure, the antenna may be provided in plural number, in which case the antennas are at predetermined intervals from each other.

In accordance with another aspect of the present disclosure, the antenna barrel may be used as a MIMO antenna or an array antenna.

In accordance with another aspect of the present disclosure, the one of the plurality of barrel to which the antenna is mounted, may be movably mounted to the camera body so as to rotate along a circumferential direction of the one of the plurality of barrels to which the antenna is mounted.

In accordance with another aspect of the present disclosure, an electronic device is provided. The electronic device includes a body and a camera assembly, wherein the camera assembly comprises an antenna with which the communication unit performs wireless communication with a counterpart electronic device.

According to various embodiments, a digital camera, which is compact-sized and which provides optimum antenna performance, is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
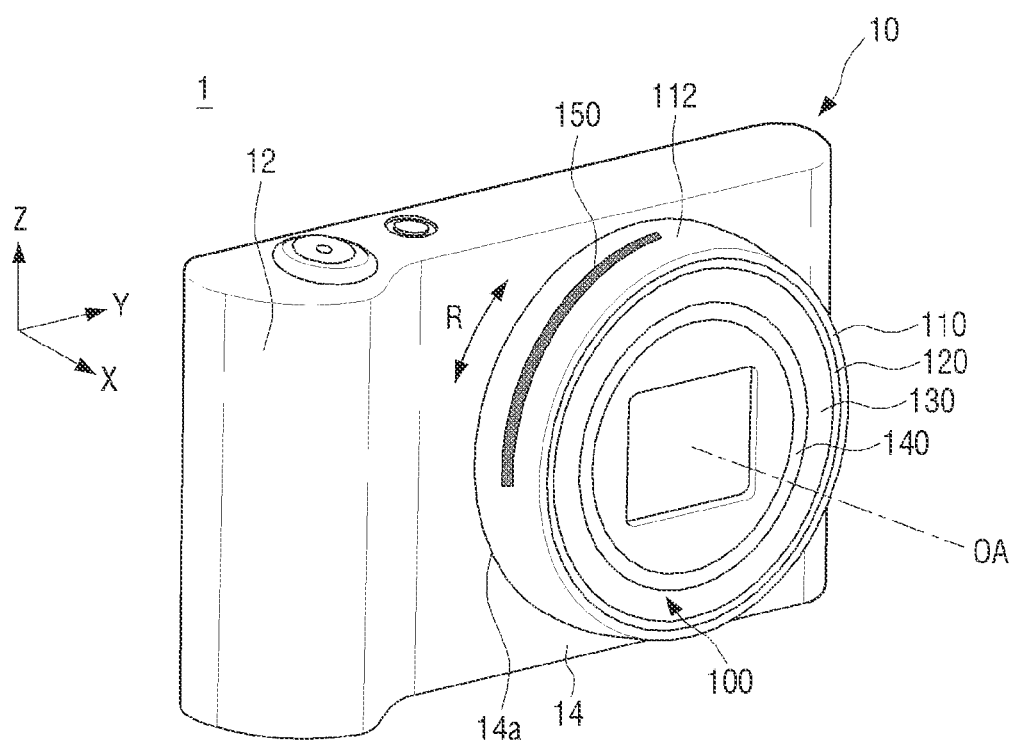
FIG. 1 is a perspective view of a digital camera according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a digital camera may include an antenna with which the camera may perform wireless communication with a counterpart electronic device.

Figure 2:
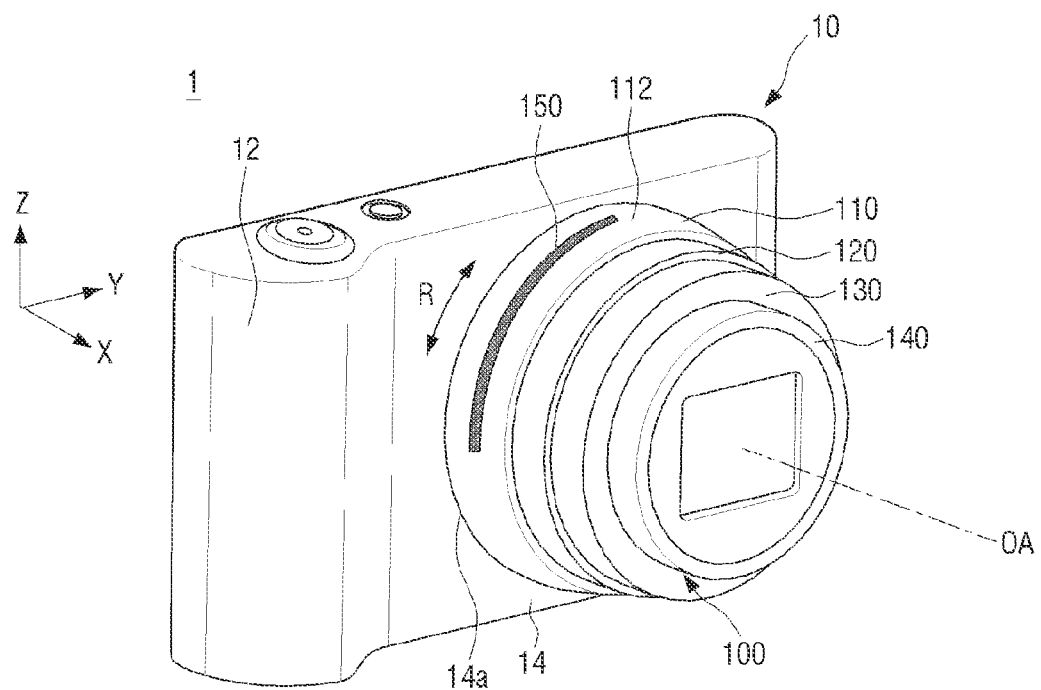
FIG. 2 is a perspective view of a digital camera such as, for example, the digital camera illustrated in FIG. 1, illustrating a lens barrel assembly in moving-forward position according to an embodiment of the present disclosure.

FIG. 1 is a perspective view of a digital camera according to an embodiment of the present disclosure. FIG. 2 is a perspective view of a digital camera such as, for example, the digital camera illustrated in FIG. 1, illustrating a lens barrel assembly in moving-forward position according to an embodiment of the present disclosure.

Referring to FIGS. 1 and 2, a digital camera 1 may communicate with an external device (not illustrated) by wireless communication. The digital camera 1 includes a camera body 10 and a lens barrel assembly 100.

The camera body 10 includes an external casing 12 which forms an exterior of the digital camera 1. The external casing 12 includes therein a power unit (not illustrated) (e.g., battery), a wireless communication module (not illustrated), and/or the like. The external casing 12 is formed from a metal material. For example, the external casing 12 is formed from a metal material which could enhance design of the digital camera 1 to appeal high quality product image. For example, the external casing 12 may be formed from aluminum or magnesium.

The lens barrel assembly 100 may include a plurality of photographing lens groups therein, and preform zooming and focusing operations while moving along an Optical Axis (OA). The lens barrel assembly 100 is mounted to the camera body 10 through an opening 14a formed on a front portion 14 of the external casing 12.

The lens barrel assembly 100 includes a plurality of barrels 110, 120, 130, 140 each accommodating therein a plurality of photographing lenses. Like the external casing 12, the plurality of barrels 110, 120, 130, 140 may be formed from metal materials for the purpose of design. For example, the plurality of barrels 110, 120, 130, 140 may be formed from aluminum or magnesium.

The plurality of barrels 110, 120, 130, 140 may include a first barrel 110, a second barrel 120, a third barrel 130, and a fourth barrel 140.

The first barrel 110 may be arranged on outer-most side among the plurality of barrels 110, 120, 130, 140, while the fourth barrel 140 may be arranged on inner-most side among the plurality of barrels 110, 120, 130, 140. Accordingly, among the plurality of barrels 110, 120, 130, 140, the first barrel 110 may be farthest from the optical axis OA, while the fourth barrel 140 may be closest to the optical axis OA. The second barrel 120 and the third barrel 130 may be arranged between the first barrel 110 and the fourth barrel 140. The second 120, third barrel 130, and fourth barrel 140 are movable forward and backward along the OA, while the first barrel 110, which is at the outer-most side, may fixed on the camera body 10, so as not to move in the zooming or focusing operation. Various embodiments of the present disclosure are not limited thereto. According to various embodiments of the present disclosure, the first barrel 110 may be movably mounted to rotate along the circumferential direction (R).

A slit 150 may be formed along circumferential direction of the first barrel 110, on an external circumference 112 of the first barrel 110. The slit 150 may be provided to decorate the appearance of the digital camera 1, to shield from the ElectroMagnetic Interference (EMI), and/or the like. The slit 150 is filled with non-metal material. According to various embodiments of the present disclosure, the slit 150 may be filed with dielectric material. However, various embodiments of the present disclosure are not limited thereto. Accordingly, the slit 150 may be filled with non-metal materials other than dielectric material. Alternatively, according to various embodiments of the present disclosure, the slit 150 may not be filled.

The slit 150 may be arranged close to a front surface 116 (see FIG. 5) of the first barrel 110, or arranged close to a rear surface 118 (see FIG. 5) of the first barrel 110. When viewed from the front side of the digital camera 1, the slit 150 may be formed in an area which can be between 9:00 and 12:00 in clockwise direction. However, various embodiments of the present disclosure are not limited thereto. Accordingly, the slit may be formed at an appropriate location in consideration of design.

According to various embodiments of the present disclosure, the digital camera may construct an antenna for wireless communication purpose, using the front surface 14 of the external casing 12 and the first barrel 110 with the slit 150 formed therein of the lens barrel assembly 100, which will be explained in detail below. For example, the digital camera 1 may have an antenna for wireless communication disposed on or otherwise integrated with the digital camera 1. According to various embodiments of the present disclosure one or more of the first barrel 110, the second barrel 120, the third barrel 130, and the fourth barrel 140 may be used as an antenna.

Figure 3:
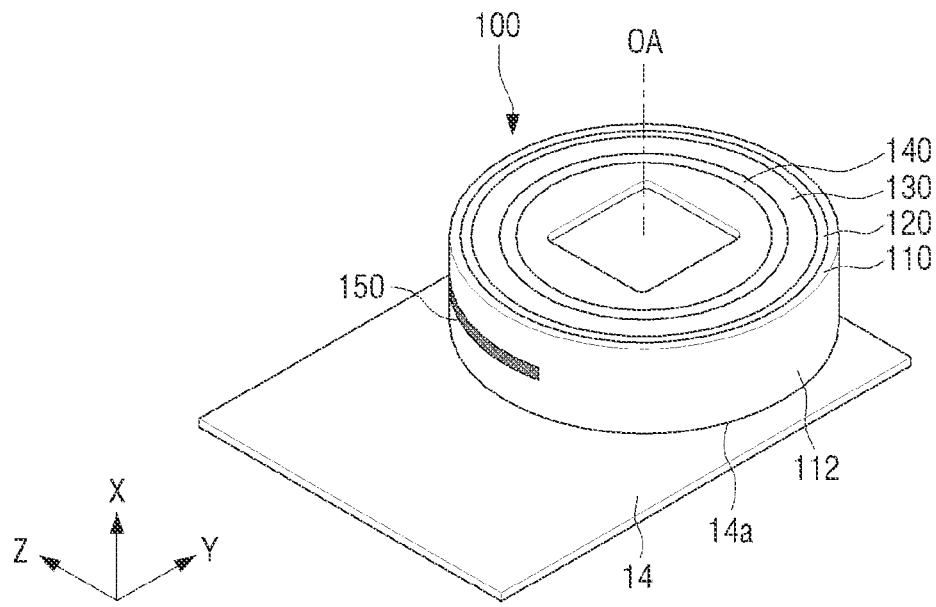
FIG. 3 illustrates components of a digital camera such as, for example, the digital camera illustrated in FIG. 1 performing a function of an antenna according to an embodiment of the present disclosure.

FIG. 3 illustrates components of a digital camera such as, for example, the digital camera illustrated in FIG. 1 performing a function of an antenna according to an embodiment of the present disclosure.

Referring to FIG. 3, the first barrel 110 may be used as an antenna barrel 110 to transmit and receive radio waves. For convenience of explanation, the first barrel 110 will be referred to as an 'antenna barrel'. The antenna barrel 110 is formed from metal material as explained above. The antenna barrel 110 may include the slit 150 filled with non-metal material M (see FIG. 4). Accordingly, the antenna barrel 110 may be used as an antenna which radiates radio waves through the slit 150.

The front surface 14 of the external casing 12 may be formed from metal material (e.g., aluminum or magnesium). The front surface 14 may surround the external circumference of the antenna barrel 110. The front surface 14 may be arranged perpendicularly to the antenna barrel 110. Accordingly, the front surface 140 may function as a ground of the antenna barrel 110.

The antenna barrel 110 may be provided with sufficient ground area due to the presence of the front surface 14. According to various embodiments of the present disclosure, because the antenna barrel 110 is arranged perpendicularly to the front surface 14 (e.g., ground), the antenna barrel 110 may maximize emission of radio waves in the forward (X direction) and upward (Z direction) of the digital camera 1.

According to various embodiments of the present disclosure, because the antenna barrel 110, which is exposed to outside, and the front surface 14 of the external casing 12 are respectively used as an antenna and a ground, the digital camera 1 may have maximized emission of radio waves efficiency, without suffering hindrance to radiation due to presence of other components which may be formed in between. Further, because space for the antenna and ground can be saved, the digital camera 1 can be compact-sized Further, because the slit 150 to radiate radio waves is formed in area between 9:00 and 12:00 in clockwise direction, the digital camera 1 has minimized hindrance of radiation due to presence of hands of the user who may be holding the digital camera 1. According to various embodiments of the present disclosure, positioning of the slit 150 may be configured according to the areas of the digital camera 1 that may be grasped by a user during use of the digital camera 1.

According to various embodiments of the present disclosure, when the antenna barrel 110 is movably mounted so as to rotate in the circumferential direction (R), a user is enabled to rotate the antenna barrel 110 to a proper degree so that the slit 150 is positioned for the optimum radiation (e.g., an optimum or otherwise improved wireless connectivity).

Hereinbelow, a feeding structure of the antenna barrel 110 will be explained.

Figure 4:
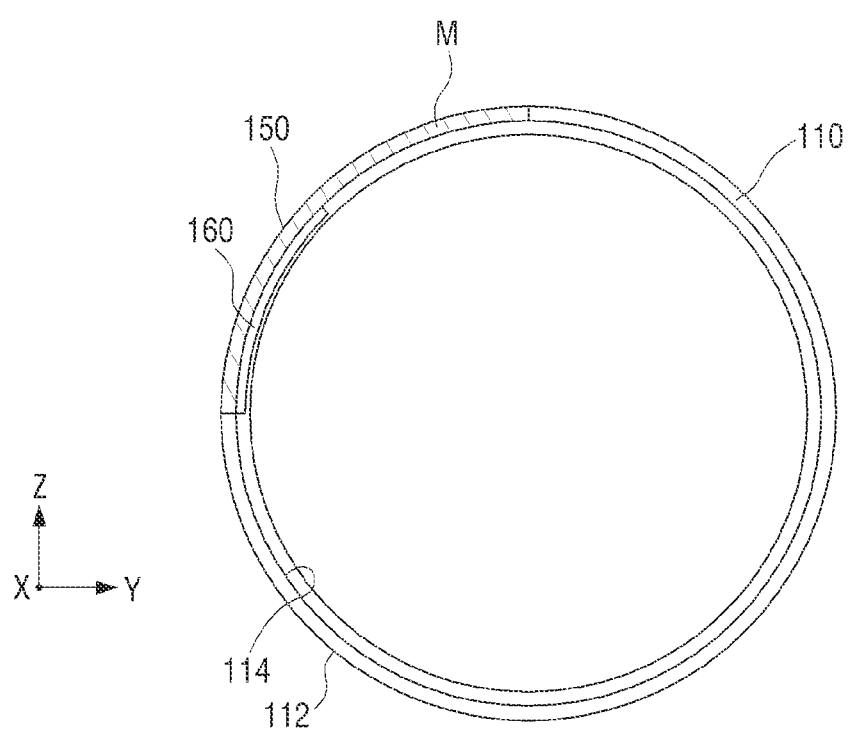
FIG. 4 is a cross section view of an antenna barrel such as, for example, the antenna barrel illustrated in FIG. 3 according to an embodiment of the present disclosure.
Figure 5:
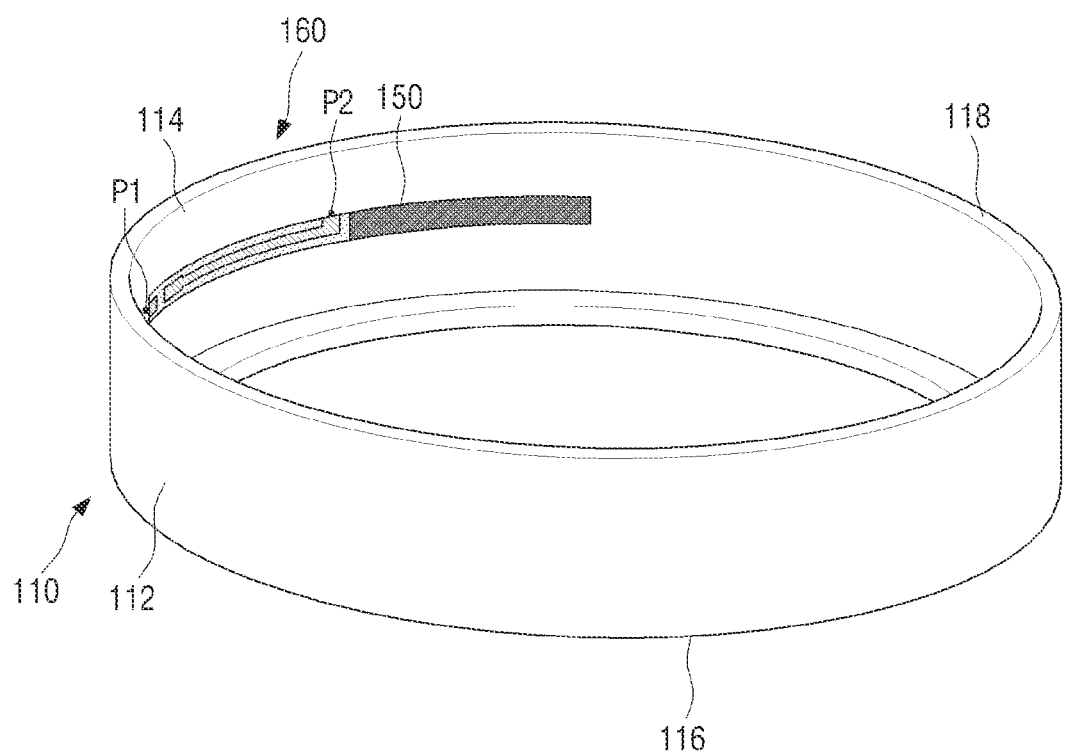
FIG. 5 is a perspective view illustrating an interior of an antenna barrel such as, for example, the antenna barrel illustrated in FIG. 3 according to an embodiment of the present disclosure.
Figure 6:
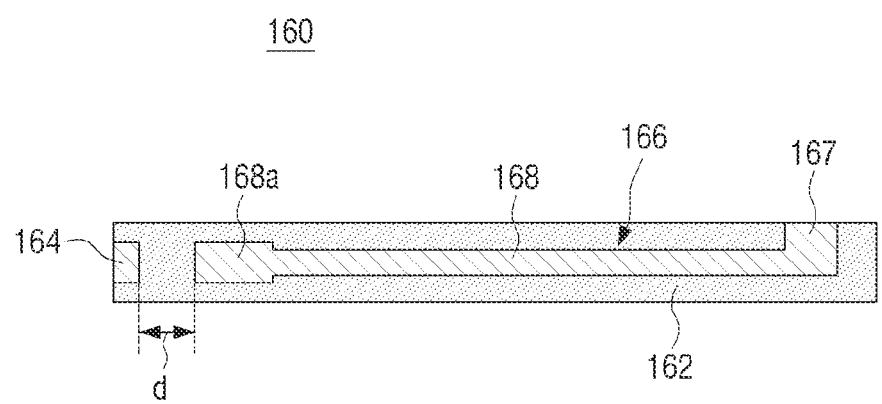
FIG. 6 illustrates a feeding unit mounted to an antenna barrel such as, for example, the antenna barrel illustrated in FIG. 5 according to an embodiment of the present disclosure.
Figure 7A:
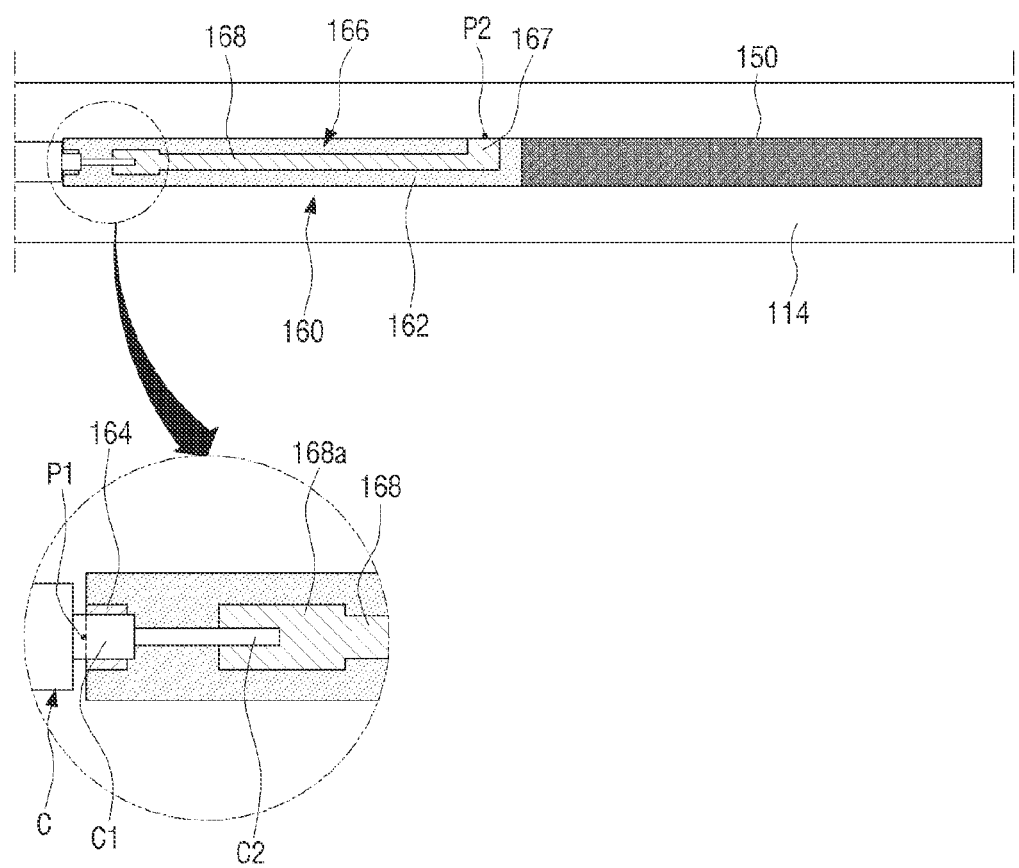
FIG. 7A illustrates a cable connection for feeding at an antenna barrel such as, for example, the antenna barrel illustrated in FIG. 3 according to an embodiment of the present disclosure.
Figure 7B:
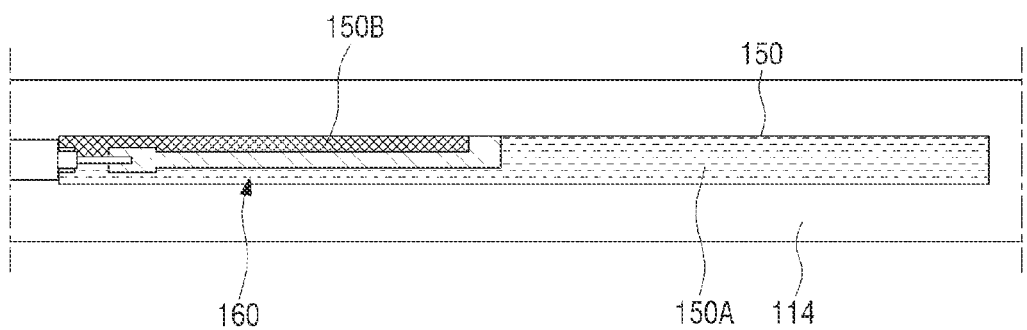
FIG. 7B illustrates an additional slit formed by a feeding unit such as, for example, the feeding unit illustrated in FIG. 7A according to an embodiment of the present disclosure.

FIG. 4 is a cross section view of an antenna barrel such as, for example, the antenna barrel illustrated in FIG. 3 according to an embodiment of the present disclosure. FIG. 5 is a perspective view illustrating an interior of an antenna barrel such as, for example, the antenna barrel illustrated in FIG. 3 according to an embodiment of the present disclosure. FIG. 6 illustrates a feeding unit mounted to an antenna barrel such as, for example, the antenna barrel illustrated in FIG. 5 according to an embodiment of the present disclosure. FIG. 7A illustrates a cable connection for feeding at an antenna barrel such as, for example, the antenna barrel illustrated in FIG. 3 according to an embodiment of the present disclosure. FIG. 7B illustrates an additional slit formed by a feeding unit such as, for example, the feeding unit illustrated in FIG. 7A according to an embodiment of the present disclosure.

Referring to FIGS. 4, 5, 6, 7A, and 7B, the digital camera 1 includes a feeding unit 160 configured to feed voltage to the antenna barrel 110 (e.g., for the purpose of emission of radio waves). The feeding unit 160 may be mounted to an inner circumference 114 of the antenna barrel 110, and may extend along the slit 150 to partially cover the slit 150.

Referring to FIG. 6, the feeding unit 160 includes a base plate 162, a first feeding member 164 and a second feeding member 166.

The base plate 162 may be formed as a flexible printed circuit board. For example, the base plate 162 (e.g., the flexible printed circuit board) may be insulating. The base plate 162 may have a width that corresponds to the width of the slit 150. The base plate 162 may be mounted to the inner circumference 114 of the antenna barrel 110 so as to be arranged parallel to the slit 150.

The first feeding member 164 may be formed on the base plate 162. The first feeding member 164 may be formed from a conductive metal material so as to conduct voltage. For example, the first feeding member 164 may be formed from copper. The second feeding member 166 may be contacted to a second point (P2) of the antenna barrel 110, when the base plate 162 is mounted to the inner circumference 114 of the antenna barrel 110 (see FIG. 7A).

The second feeding member 166 may be formed on the base plate 162. The second feeding member 166 may be formed from conductive metal material similar to the first feeding member 164. For example, the second feeding member 166 may be formed from copper. The second feeding member 166 may be contacted to a second point (P2) of the antenna barrel 110, when the base plate 162 is mounted to the inner circumference 114 of the antenna barrel 110 (see FIG. 7A).

The second feeding member 166 may include a barrel contact 167 and an extension portion 168.

The barrel contact 167 may protrude from one upper side of the base plate 162 along a widthwise direction of the base plate 162. Referring to FIG. 7A, the barrel contact 167 may be contacted with a second point (P2) of the antenna barrel 110.

The extension portion 168 extends from the barrel contact 167 along the lengthwise direction of the base plate 162 toward the first feeding member 164. One end 168*a* of the extension portion 168 may be arranged at a predetermined distance (d) from the first feeding member 164.

Referring to FIG. 7A, a cable (C) is connected to the power unit and may be connected to the feeding unit 160 to feed power to the antenna barrel 110. As an example, a first portion (C1) of the cable (C) may be mounted so as to contact the first feeding member 164 to thus feed first voltage (V1) to the first point (P1) of the antenna barrel 110. The first portion (C1) of the cable (C) may be mounted by soldering. The second portion (C2) of the cable (C) may be mounted so as to contact the extension portion 168 of the second feeding member 166 to thus feed second voltage (V2) to the second point (P2) of the antenna barrel 110. The second portion (C2) of the cable (C) may be mounted by soldering. To ensure sufficient space for soldering, the soldering may be performed at an end 168*a* which may be relatively thicker. As a result of the presence of the feeding unit 160, the cable (C) may be mounted in the lengthwise direction of the slit 150, as illustrated in FIG. 7A.

The antenna barrel 110 may have varying antenna impedance. For example, the antenna barrel 110 may have an antenna impedance that varies depending on the lengths and/or widths of the first feeding member 164 and/or the second feeding member 166. Accordingly, the first feeding member 164 and the second feeding members 166 may be designed to proper lengths and widths depending on a necessary or a preferred antenna impedance.

Further, when the first and second feeding members are connected through the cable (C), referring to FIG. 7B, a second slit 150B may be provided, in addition to the entire slit 150A. According to various embodiments of the present disclosure, using the second slit 150B, implementing a dual band antenna with the antenna barrel 110 may be possible.

Figure 8:
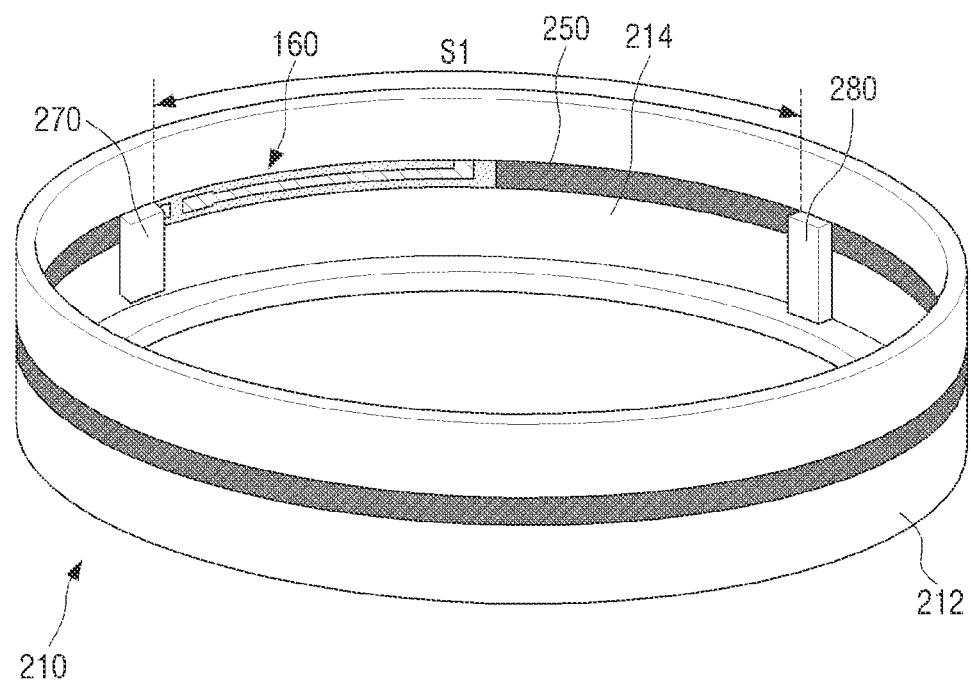
FIG. 8 is a perspective view illustrating an interior of an antenna barrel according to an embodiment of the present disclosure.

FIG. 8 is a perspective view illustrating an interior of an antenna barrel according to an embodiment of the present disclosure.

Referring to FIG. 8, the slit 250 of the antenna barrel 210 may be filled with dielectric material for the purpose of decoration of the digital camera 1 and/or for EMI shielding. The slit 250 may be formed to completely surround the external circumference 212 of the antenna barrel 210.

A first conductive member 270 and a second conductive member 280 may be mounted to the inner circumference 214 of the antenna barrel 210. Similar to the antenna barrel 210, the first conductive member 270 and the second conductive member 280 may be formed from metal material. For example, the first conductive member 270 and the second conductive member 280 may be formed from aluminum or magnesium.

The first conductive member 270 may be overlapped with the slit 250, and may contact the feeding unit 160. The second conductive member 280 may be overlapped with the slit 250 and may be disposed at a predetermined distance (S1) from the first conductive member 270. The distance between the first conductive member 270 and the second conductive member 280 may be appropriately varied. For example, the distance between the first conductive member 270 and the second conductive member 280 may be varied depending on the length (S1) of the slit 250 as is required in order to ensure a specific frequency (e.g., for wireless communication).

Figure 9:
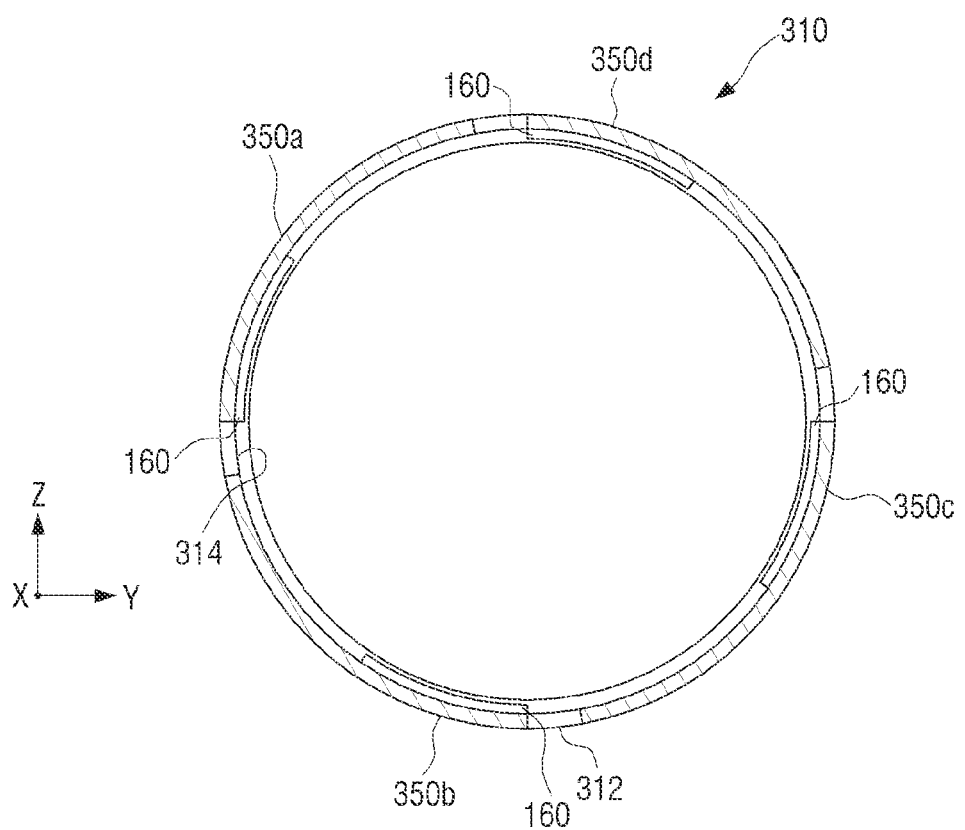
FIG. 9 is a cross section view of an antenna barrel according to an embodiment of the present disclosure.

FIG. 9 is a cross section view of an antenna barrel according to an embodiment.

Referring to FIG. 9, the antenna barrel 310 according to an embodiment includes a plurality of slits 350a, 350b, 350c, and 350d. The number of the slits may be varied depending on needs, although it is explained herein that there are four slits 350a, 350b, 350c, and 350d provided. According to various embodiments of the present disclosure, the slits 350a, 350b, 350c, and 350d are respectively at a predetermined interval along a circumferential direction of the antenna barrel 310.

Feeding units 160 are mounted to the inner circumference 314 of the antenna barrel 310 to partially cover the respective slits 350a, 350b, 350c, and 350d. The antenna barrel 310 may include four feeding units 160 to correspond to the four slits 350a, 350b, 350c, and 350d.

The four slits 350a, 350b, 350c, and 350d each may function as an antenna which may transmit and receive radio waves. For example, the four slits 350a, 350b, 350c, 350d each may function as an antenna which may independently transmit and receive radio waves. The slits 350a, 350b, 350c, and 350d may be arranged at different locations. As a result, the slits 350a, 350b, 350c, and 350d may have different patterns or efficiencies of emission of radio waves. According to various embodiments of the present disclosure, one of the four slits 350a, 350b, 350c, 350d that can achieve optimum antenna function, may be selected and used.

According to various embodiments of the present disclosure, the four slits 350a, 350b, 350c, and 350d may be designed so as to operate as Multiple-Input Multiple-Output (MIMO) antennas or array antennas.

Figure 10:
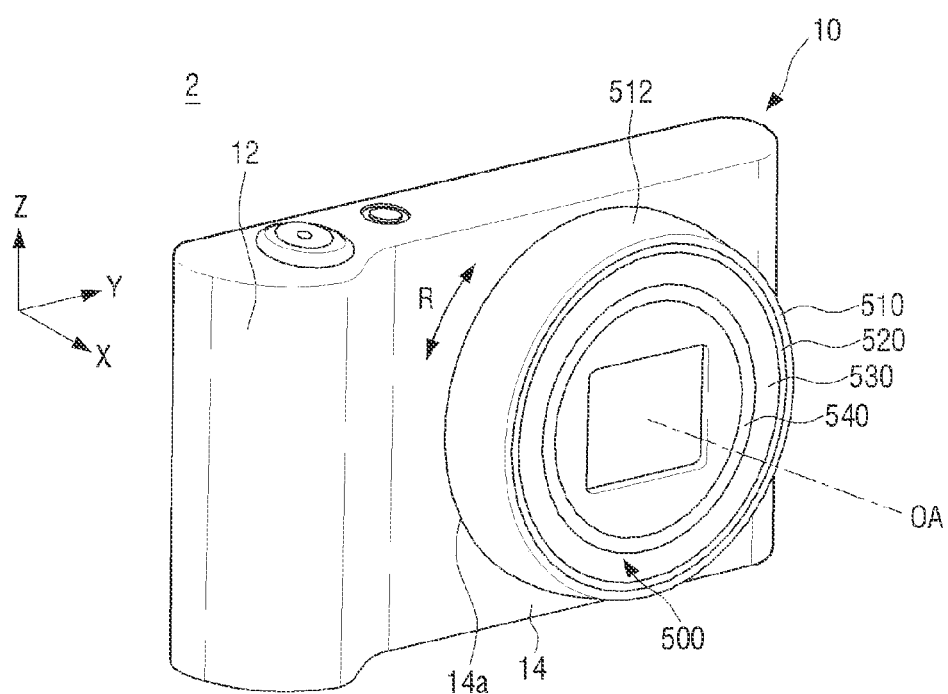
FIG. 10 is a schematic perspective view of a digital camera according to an embodiment of the present disclosure.
Figure 11:
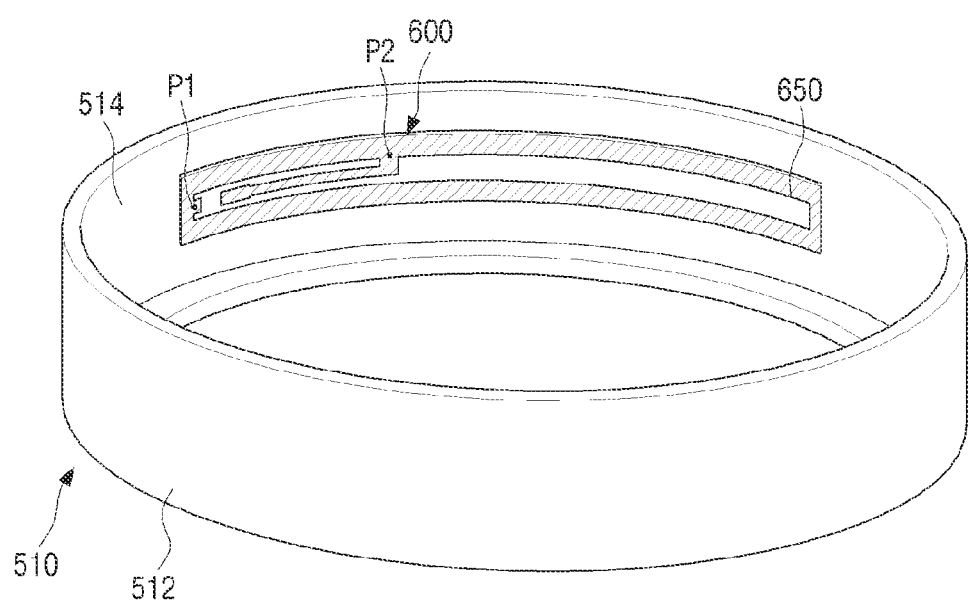
FIG. 11 is a perspective view of a first barrel of a lens barrel assembly of a digital camera such as, for example, the digital camera illustrated in FIG. 10 according to an embodiment of the present disclosure.
Figure 12:
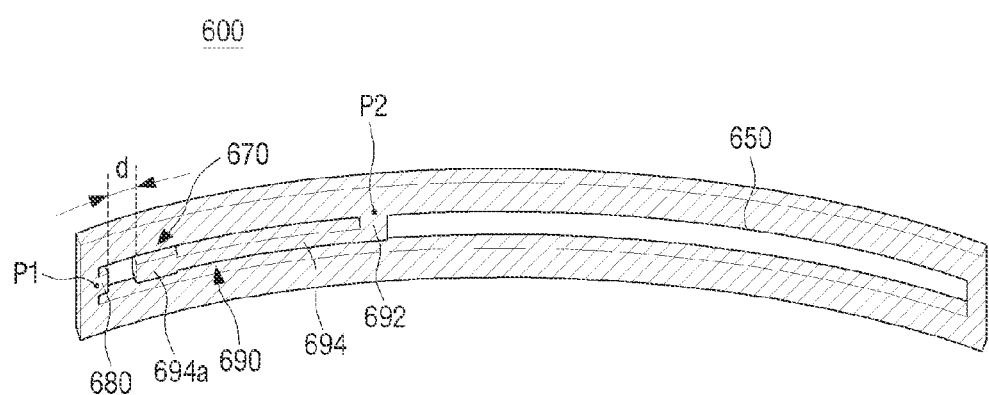
FIG. 12 is a perspective view of an antenna mounted to a first barrel such as, for example, the first barrel illustrated in FIG. 11 according to an embodiment of the present disclosure.
Figure 13A:
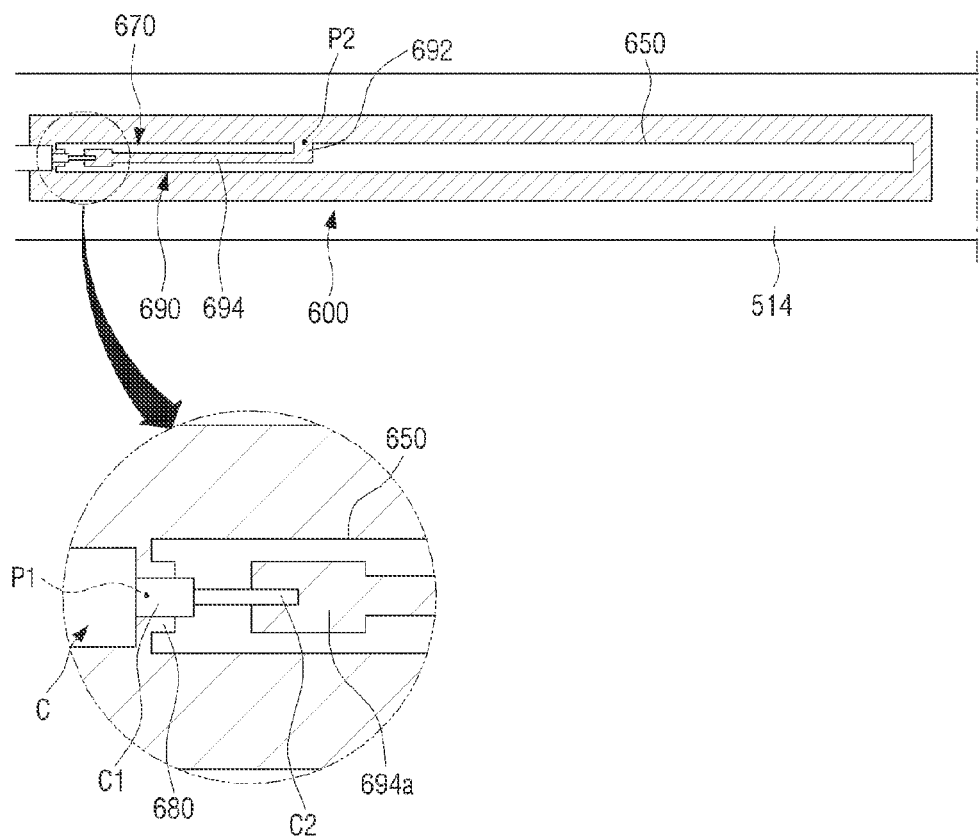
FIG. 13A illustrates a cable connection for feeding to an antenna mounted to a first barrel such as, for example, the first barrel illustrated in FIG. 11 according to an embodiment of the present disclosure.
Figure 13B:
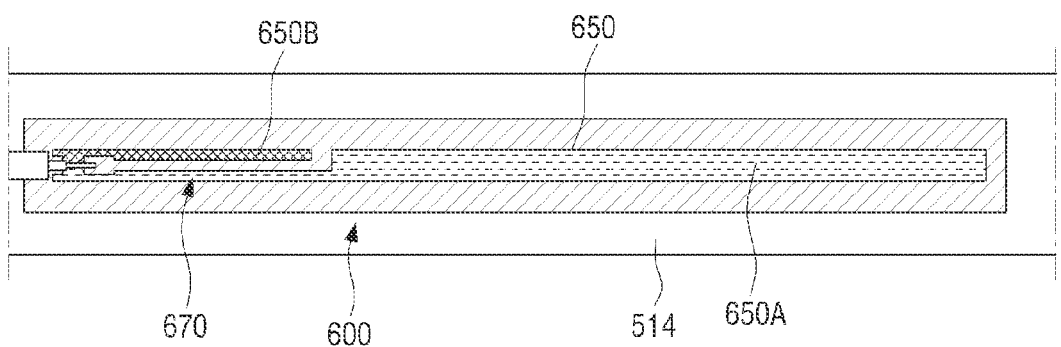
FIG. 13B illustrates an additional slit formed by a feeding unit such as, for example, the feeding unit illustrated in FIG. 13A according to an embodiment of the present disclosure.

FIG. 10 is a schematic perspective view of a digital camera according to an embodiment of the present disclosure. FIG. 11 is a perspective view of a first barrel of a lens barrel assembly of a digital camera such as, for example, the digital camera illustrated in FIG. 10 according to an embodiment of the present disclosure. FIG. 12 is a perspective view of an antenna mounted to a first barrel such as, for example, the first barrel illustrated in FIG. 11 according to an embodiment of the present disclosure. FIG. 13A illustrates a cable connection for feeding to an antenna mounted to a first barrel such as, for example, the first barrel illustrated in FIG. 11 according to an embodiment of the present disclosure. FIG. 13B illustrates an additional slit formed by a feeding unit such as, for example, the feeding unit illustrated in FIG. 13A according to an embodiment of the present disclosure.

Referring to FIG. 10, the digital camera 2 includes a camera body 10 and a lens barrel assembly 500. According to various embodiments of the present disclosure, the digital camera 2 may have similar shape and function as the digital camera 1 of various embodiments of the present disclosure explained above, and therefore, differences from the digital camera 1 of the previous embodiment will be mainly explained hereinbelow for the sake of brevity.

The lens barrel assembly 500 includes a plurality of barrels 510, 520, 530, 540. Differently from the various embodiments explained above, the plurality of barrels 510, 520, 530, 540 may be formed from non-metal materials. For example, the plurality of barrels 510, 520, 530, 540 may be formed from plastic material.

The plurality of barrels 510, 520, 530, 540 may include a first barrel 510, a second barrel 520, a third barrel 530, and a fourth barrel 540.

Similar to the first barrel 110 of the various embodiments of the present disclosure explained above, the first barrel 510 may be fixed to the camera body 10 or movably mounted so as to rotate along a circumferential direction (R).

Referring to FIGS. 11 and 12, the digital camera 2 may include an antenna 600 for wireless communication. The antenna 600 may be formed from a metal material which may be, for example, a copper.

The antenna 600 may be mounted to an inner circumference 514 of the first barrel 510, and may include a slit 650 and a feeder 670.

The slit 650 may be provided to emit radio waves for the purpose of radio transmission and reception. The slit may be configured in a rectangular shape. According to various embodiments of the present disclosure, the antenna 600 may function as a slit antenna which has the slit 650 therein. The slit may be formed along a circumferential direction of the first barrel 510, on an external circumference 512 of the first barrel 510.

The feeder 670 feeds voltage for the purpose of radio emission at the antenna 600. The feeder 670 may include a first feeder 680 and a second feeder 690.

The first feeder 680 feeds a first voltage V1 to a first point P1 of the antenna 600. The first feeder 680 may be protruded from the first point P1 into the slit 650.

The second feeder 690 feeds a second voltage V2 to a second point P2 of the antenna 600, and is extended from the second point P2 within the slit 650 toward the first feeder 680.

The second feeder 690 may include a protrusion portion 692 and an extension portion 694.

The protrusion portion 692 may protrude from the second point P2 along a widthwise direction of the slit 650. The extension portion 694 may extend from the protrusion portion 692 along a lengthwise direction of the slit 650 and may be arranged at a predetermined distance (d) from the first feeder 680.

Referring to FIG. 13A, the cable C, which is connected to the power unit, may be connected to the feeder 670 of the antenna 600 for the purpose of antenna 600 feeding. For example, a first portion C1 of the cable C may be mounted so as to be in contact with the first feeder 680 so that the first voltage V1 is fed to the first point P1 of the antenna 600. The first portion C1 of the cable C may be mounted by soldering. A second portion C2 of the cable C may be mounted so as to be in contact with the extension portion 694 of the second feeder 690 so that the second voltage V2 is fed to the second point P2 of the antenna barrel 110. The second portion C2 of the cable C may be mounted by soldering.

The soldering may be done at one end 694a of the extension portion 694 which may be relatively thicker, in order to ensure more space for the soldering. As a result of the presence of the feeder 670, the cable C may be mounted in a lengthwise direction of the slit 650.

According to various embodiments of the present disclosure, similar to the digital camera 1 of the various embodiments of the present disclosure described above, the first feeder 680 and the second feeder 690 of the digital camera 2 may be designed to appropriately varied lengths or widths depending on a necessary or a preferred antenna impedance.

Further, similar to the digital camera 1 of the various embodiments of the present disclosure described above, when the first feeder 680 and the second feeder 690 are connected, the antenna 600 may have additional slit 650B in addition to the entire slits 650A (see FIG. 13B), and may thus construct a dual band antenna.

Further, when the first barrel 510 is movably mounted to rotate along the circumferential direction R, similar to the digital camera 1 of the various embodiments of the present disclosure described above, the user may properly rotate the first barrel 510, so that the slit 650 is positioned at a place at which optimum (or improved) radio wave emission is provided.

Although not illustrated herein, according to various embodiments of the present disclosure, the digital camera 2 may include a plurality of antennas provided along a circumferential direction R of the first barrel. When the digital camera includes a plurality of antennas, as explained above with reference to FIG. 9, one of the antennas that can provide optimum (e.g., improved) antenna performance may be selected and used, depending on circumstances.

According to various embodiments of the present disclosure, the four slits 350a, 350b, 350c, 350d may be designed so as to operate as MIMO antennas or array antennas.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A digital camera capable of performing wireless communication with an external device, the digital camera comprising:
   a camera body; and
   a lens barrel assembly mounted to the camera body and comprising
   a plurality of barrels for accommodating a plurality of photographing lenses,
   wherein at least one of the plurality of barrels is used as an antenna barrel configured as an antenna for the wireless communication,
   wherein the antenna barrel is formed from a metal material and comprises at least one slit filled with a dielectric material, so that
   the antenna barrel emits radio waves to perform the antenna function, and
   wherein an outer casing of the camera body, which surrounds an outer surface of the antenna barrel, is formed from a metal material so as to operate as a ground of the antenna barrel.

2. The digital camera of claim 1, wherein the antenna barrel is one of the plurality of barrels that is arranged at an outermost side.

3. The digital camera of claim 1, wherein the outer casing that surrounds the outer surface of the antenna barrel, is arranged perpendicularly to the antenna barrel.

4. The digital camera of claim 1, wherein the slit is formed along a circumferential direction of the antenna barrel.

5. The digital camera of claim 4, further comprising:
   a feeding unit mounted to an inner circumference of the antenna barrel and configured to feed voltage to the antenna barrel.

6. The digital camera of claim 5, wherein the feeding unit is extended along the slit to partially cover the slit.

7. The digital camera of claim 6, wherein the feeding unit comprises:
   a first feeding member which is conductive, and which is in contact with a first point of the antenna barrel to feed a first voltage to the first point; and
   a second feeding member which is conductive, and which is in contact with a second point of the antenna barrel to feed a second voltage to the second point, wherein the second feeding member comprises,
   a barrel contact which is in contact with the second point, and
   an extension portion extended from the barrel contact toward the first feeding member.

8. The digital camera of claim 5, wherein the slit is formed to surround an outer circumference of the antenna barrel,
   wherein the slit is mounted to an inner wall of the antenna barrel are a first conductive member and a second conductive members which are at predetermined interval and which are overlapped with the slit, respectively, and
   wherein one of the first and second conductive members is in contact with the feeding unit.

9. The digital camera of claim 4, wherein the slit of the antenna barrel may be provided in plural number, in which case the slits are disposed at predetermined intervals from each other.

10. The digital camera of claim 9, wherein the antenna barrel is used as at least one of a Multiple-Input Multiple-Output (MIMO) antenna and an array antenna.

11. The digital camera of claim 4, wherein the antenna barrel is movably mounted to the camera body so as to rotate along a circumferential direction of the antenna barrel.

12. A digital camera capable of performing wireless communication with an external device, the digital camera comprising:
a camera body;
a lens barrel assembly mounted to the camera body and comprising a plurality of barrels for accommodating a plurality of photographing lenses; and
at least one antenna for the wireless communication which is mounted to one of the plurality of barrels,
wherein the one of the plurality of barrels to which the antenna is mounted, is formed from a non-metal material, and
wherein an outer casing of the camera body, which surrounds an outer surface of the one of the plurality of barrels to which the antenna is mounted, is formed from a metal material so as to operate as a ground of the antenna.

13. The digital camera of claim 12, wherein the one of the plurality of barrels to which the antenna is mounted is a barrel among the plurality of barrels that is arranged at an outermost side of the plurality of barrels.

14. The digital camera of claim 13, wherein the outer casing that surrounds the outer surface of the one of the plurality of barrels to which the antenna is mounted, is arranged perpendicularly to the barrel to which the antenna is mounted.

15. The digital camera of claim 14, wherein the antenna is a slit antenna which has a slit formed therein, and
wherein the slit is formed along a circumferential direction of the barrel to which the antenna is mounted.

16. The digital camera of claim 15, wherein the antenna comprises a feeder configured to feed voltage for the purpose of emitting radio waves.

17. The digital camera of claim 16, wherein the feeder comprises:
a first feeder configured to feed a first voltage to a first point of the antenna; and
a second feeder configured to feed a second voltage to a second point of the antenna,
wherein the second feeder comprises,
a protrusion portion protruding from the second point in a widthwise direction of the slit, and
an extension portion extended from the protrusion portion within the slit toward the first feeder.

18. The digital camera of claim 15, wherein the antenna may be provided in plural number, in which case the antennas are at predetermined intervals from each other.

19. The digital camera of claim 15, wherein the antenna barrel is used as at least one of a Multiple-Input Multiple-Output (MIMO) antenna and an array antenna.

20. The digital camera of claim 15, wherein the one of the plurality of barrels to which the antenna is mounted, is movably mounted to the camera body so as to rotate along a circumferential direction of the one of the plurality of barrels to which the antenna is mounted.

21. An electronic device comprising:
a body;
a communication unit; and
a camera assembly;
wherein the camera assembly comprises an antenna with which the communication unit performs wireless communication with a counterpart electronic device,
wherein the antenna is provided on a lens barrel assembly of the camera assembly, and
wherein the lens barrel on which the antenna is provided comprises at least one of a portion and a slit that does not include a metallic material.

* * * * *